April 21, 1925.
A. A. TYSON
1,534,043
ANTISKIDDING DEVICE FOR AUTOMOBILES
Filed April 23, 1924  2 Sheets-Sheet 1
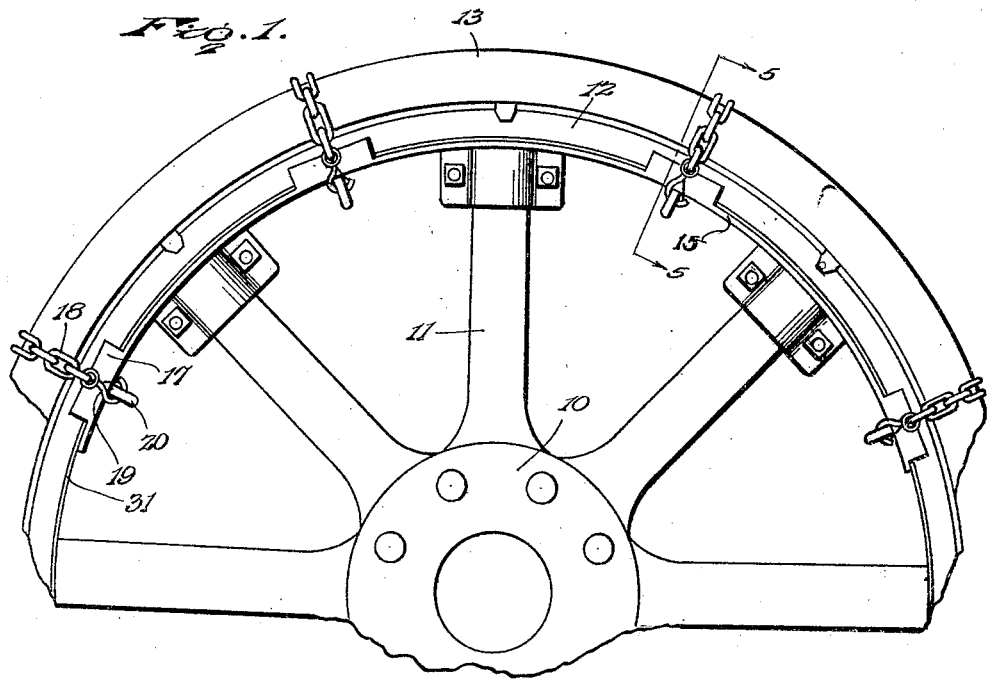
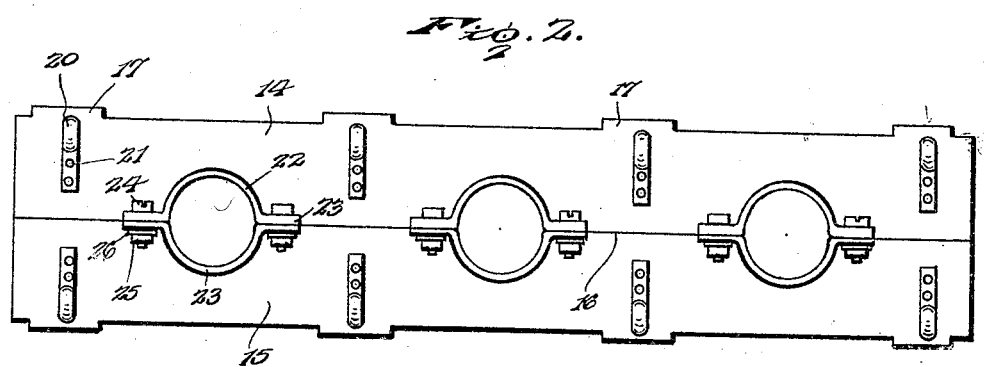
Inventor
A. A. Tyson.
By Lacey & Lacey, Attorneys

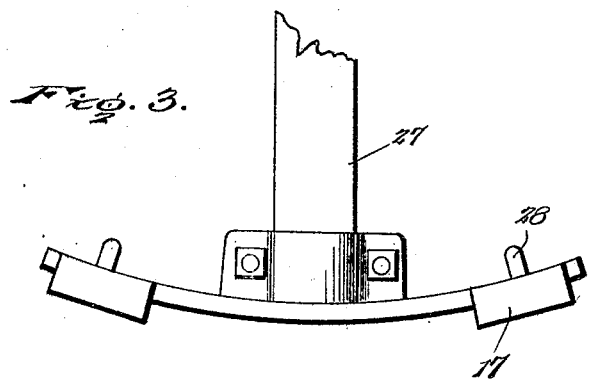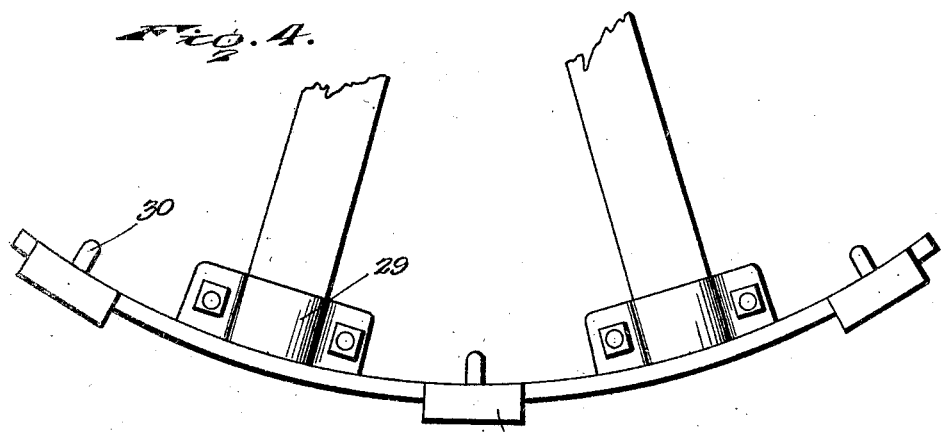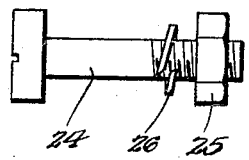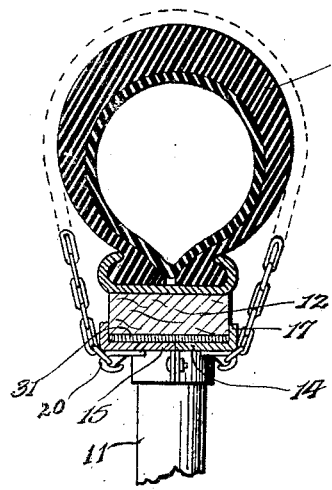

Patented Apr. 21, 1925.

1,534,043

UNITED STATES PATENT OFFICE.

AMOS A. TYSON, OF ALBANY, NEW YORK.

ANTISKIDDING DEVICE FOR AUTOMOBILES.

Application filed April 23, 1924. Serial No. 708,475.

*To all whom it may concern:*

Be it known that I, AMOS A. TYSON, a citizen of the United States, residing at Albany, in the county of Albany and State of New York, have invented certain new and useful Improvements in Antiskidding Devices for Automobiles, of which the following is a specification.

My invention relates to an anti-skidding device adapted to be attached to vehicle wheels. The device is preferably made in sections which may be attached separately to the wheel, each section engaging one or more spokes. The sections consist of arched plates adapted to rest on the inner periphery of the wheel felly while short pieces of chain are secured to the plate sections and thrown over the rubber shoe of the wheel.

One advantage of supplying the device in sections is that the short pieces of chain may easily be replaced if worn out or broken without disturbing the other pieces of chain. Another advantage resides in the fact that when the device is made in three or four sections the weight to be handled is considerably reduced and the anti-skidding device may accordingly be attached or detached in a much shorter time and at a greater convenience than usual.

In ordinary chains of this class it takes considerable time to straighten out the chains and take out all kinks before putting them on. This is entirely avoided in the present invention. If one of the short pieces of chain should happen to break it may immediately be removed without disturbing the rest of the anti-skidding device.

In the accompanying drawings, one embodiment of the invention is illustrated, and—

Figure 1 is a fragmentary side elevation of a vehicle wheel with one section of the anti-skidding device attached;

Figure 2 is a top plan view of one of the sections adapted to engage three spokes and shown developed;

Figure 3 is a side elevation of a section adapted to engage a single spoke;

Figure 4 is a side elevation of a section engaging two spokes;

Figure 5 is a transverse section along line 5—5 of Figure 1 and in larger scale.

Figure 6 is a detail of a securing bolt.

In the drawings, reference numeral 10 represents a hub of a vehicle wheel with radiating spokes 11, felly 12 and rubber tire 13.

As illustrated in Figures 1 and 2, a section engaging three spokes of a wheel is shown. This section consists of two symmetrical narrow plates 14 and 15 arched to the contour of the inner periphery of the felly, which plates abut along their inner edges, as at 16. These plates may be made of sheet metal or cast and in order to make the attachment as light as possible an aluminum alloy is preferably used. The total width across the two plates corresponds substantially to the width of the felly 12 and at intervals along the outer edges of the plates are furnished lugs or narrow guard members 17, said lugs being formed by bending down portions of the plates. The lugs engage over the sides of the felly, as best seen in Figure 5, and their purpose is to protect the felly from the rubbing of the short pieces of chain 18 which are laid around the rubber tire 13. Each piece of chain terminates with a snap hook 19 of any suitable shape which is intended to engage in eyelets 20 which are preferably riveted, as at 21, on the inner side of each section 14 and 15 and set transversely to the side edges of the plates. It will be evident that when the chains are attached to the eyelets they will never be able to injure the felly as they do not come in direct contact therewith, but, instead, rest on the lugs 17.

Along the inner edges of the plates are shown half sockets 22 and 23 shaped to fit together around the outer ends of the spokes, as indicated in Figure 1. These half sockets have corresponding ears 23 with suitable apertures for securing bolts 24. The bolts are threaded and adapted to receive nuts 25 and between each nut and the corresponding ear 33 is inserted a spring washer 26 which, when the nut is drawn up tightly, will prevent its unscrewing.

In Figure 3 is seen a section of the device adapted to engage one single spoke 27 and is provided with eyelets 28 for two chains instead of four as indicated in the above described figures. The construction of this device is in other respects the same as that described in connection with Figures 1 and 2.

In Figure 4 is shown a section having two sockets 29 for two wheel spokes, and three pairs of eyelets 30 for three pieces of chain.

In all of these sections a rubber or felt lining 31 is preferably inserted between the outer periphery of each section and the adjacent face of the felly, as best seen in Figure 5 of the drawings.

Previous to attaching the device on a wheel, the chains may be hooked onto their respective eyelets 20 and the two plates 14 and 15 closed in over the felly so that the sockets 22 and 23 engage around the spokes. The bolts 24 are then inserted and drawn up tightly by their nuts.

Another manner of attaching the device on a wheel would be to have the short chains loose and secure the plates 14 and 15, as before, to their spokes when the plates will be left in that position. The chains may thereupon be attached one by one to the eyelets and when not needed detached in the same manner while the plates are left in position. In that case, the eyelets 20 may be provided with latch springs or they may be constructed as snap hooks, see Fig. 5.

Having thus described the invention, what is claimed as new is:

1. An anti-skidding device for vehicle wheels comprising a member fitting the inner periphery of the felly and divided along a medial line in the plane of the wheel, means on said member for securing it to the spokes, gripping members adapted to fold over the tire, elements on said first member adapted to hold said gripping members in position, and spaced lugs along the outer edges of said member overhanging the sides of the felly and forming guards for said gripping members.

2. An anti-skidding device for vehicle wheels comprising a member fitting the inner periphery of the felly and divided along a medial line in the plane of the wheel, means on said member for securing it to the spokes, gripping members adapted to fold over the tire, elements on said first member adapted to hold said gripping members in position, and spaced lugs along the outer edges of said member overhanging the sides of the felly and forming guards for said gripping members; said means including split sockets adjacent said medial line, ears on the sockets, and bolts engaging in said ears and adapted to tighten the sockets around the spokes.

3. An anti-skidding device for vehicle wheels comprising a plurality of arcuate sections fitting the inner periphery of the felly, each section being divided along a medial line in the plane of the wheel, half sockets on said sections along said medial line, ears on said half sockets, bolts engaging in said ears and adapted to tighten the sockets around the spokes; spaced lugs along the outer edges of said sections overhanging the sides of the felly, an eyelet on said sections adjacent each of said lugs, and chains detachably secured in corresponding eyelets, said chains being adapted to fold over the tire while engaging with said lugs.

In testimony whereof I affix my signature.

AMOS A. TYSON. [L. S.]